Nov. 10, 1953
L. I. MENDELSOHN
2,658,805
REPULSION TYPE MAGNETIC SUSPENSION
Filed May 27, 1949
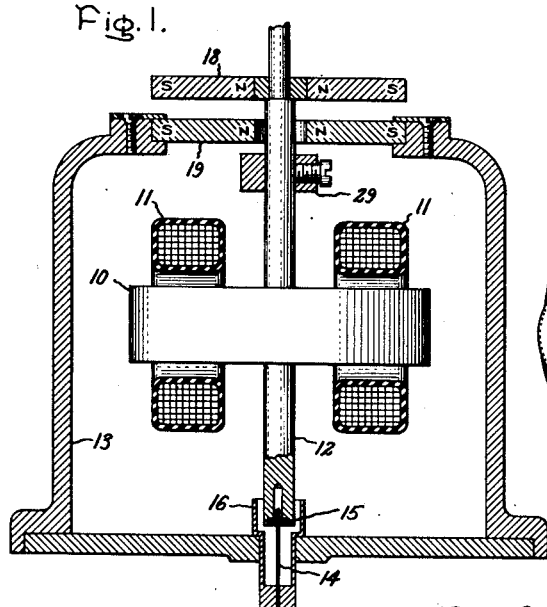
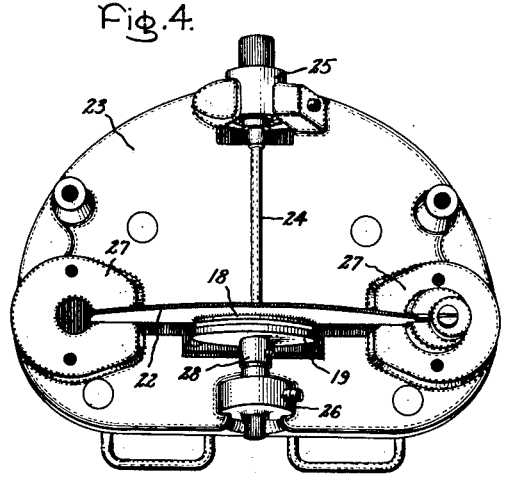
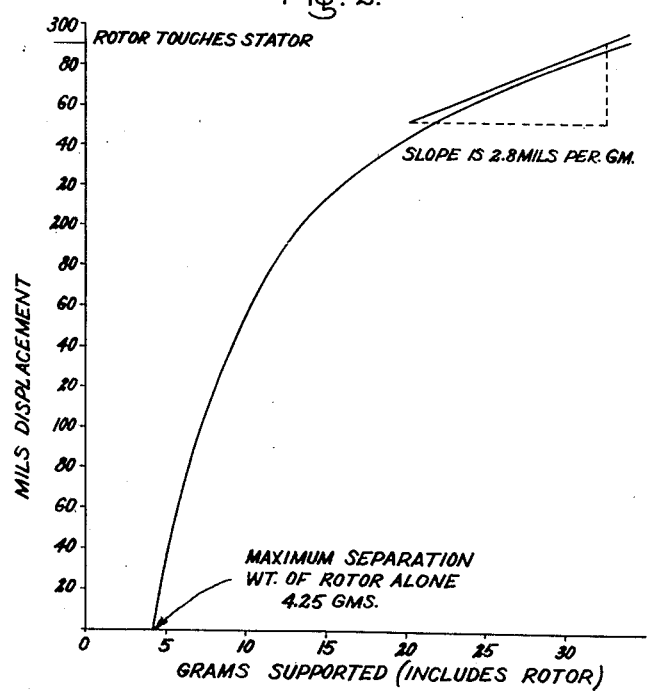
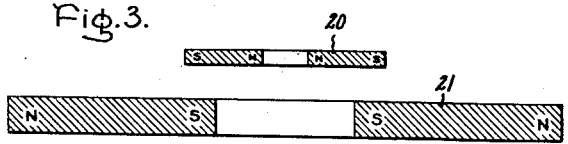
Inventor:
Lewis I. Mendelsohn,
by *Provell S. Mack*
His Attorney.

Patented Nov. 10, 1953

2,658,805

UNITED STATES PATENT OFFICE 2,658,805

REPULSION TYPE MAGNETIC SUSPENSION

Lewis I. Mendelsohn, Lynn, Mass., assignor to General Electric Company, a corporation of New York Application May 27, 1949, Serial No. 95,832

5 Claims. (Cl. 308—1)

My invention relates to magnetic suspensions such as may be used to support the weight of a vertical shaft rotating element. In its relation to the prior art, my invention may be considered as an improvement over the repulsion type magnetic suspension disclosed in United States Patent No. 2,315,408 to Faus, March 30, 1943, and assigned to the same assignee as the present invention. In the Faus patent, the repulsion magnets are magnetized in the axial direction of the suspension. I have found that considerable saving of space and greater economy of the use of permanent magnetic material and a superior suspension may be had if the suspension magnets are magnetized in radial directions.

The features of my invention which are believed to be novel and patentable will be pointed out in the claims appended hereto. For a better understanding of my invention, reference is made in the following description to the accompanying drawing in which Fig. 1 is a cross-sectional view through a vertical shaft measuring instrument in which the weight of the rotary element is supported by my improved magnetic suspension. Fig. 2 is a displacement-weight suspension curve characteristic of my invention. Fig. 3 is a cross section through a modified form of my invention where the radius and weight of the rotary magnet have been reduced in comparison to that of the stationary magnet, and Fig. 4 illustrates my magnetic suspension as applied to an induction disk meter.

Referring now to Fig. 1, 10 and 11 represent rotor and stator coil portions of an electrical measuring instrument, the rotor part 10 being mounted on a vertical shaft 12 for rotation or deflection in response to the measurement desired. Numeral 13 represents a portion of a casing or housing for the meter, and such housing supports a resilient pivot pin 14 extending upwardly to be received in a ring guide bearing 15 located in a recess in the lower end of shaft 12. The fit between guide pin 14 and guide ring 15 is sufficiently free that there is negligible friction. A collar 16 rises loosely about the lower end of the shaft from the housing to prevent any large lateral displacement of the lower end of the shaft, such as might occur during shipment or rough handling, and which might otherwise damage the guide bearing parts. A similar or equivalent guide bearing will be provided at the upper end of the shaft such as indicated at 25 in Fig. 4. Meter parts not pertinent to the present invention have been omitted.

The entire weight of the moving coil system and shaft is supported by my magnetic suspension which consists of washer-shaped permanent magnets 18 and 19, which are similarly polarized in radial directions as represented by the N and S markings thereon. By stating in the claims that the magnets are uniformly radially polarized or uniformly magnetized radially, I mean that the lines of magnetic force are in a radial direction; that is, the shortest distance between the inside and outside peripheries of the washer-shaped magnets and uniform at all radii as might be represented by an infinite number of radial arrows equally spaced and of uniform thickness and length, and all pointing towards or away from the axial center. The upper magnet 18 is fastened to the shaft 12 at its inner periphery, and the lower magnet 19 is supported at its outer periphery by the meter housing structure 13. The magnets are parallel to each other and concentric with the axis of rotation of the shaft and maintained in such concentric relation by the guide bearings. The minimum vertical spacing between the magnets under normal conditions may be of the order of 0.02 inch. There is magnetic repulsion between the magnets 18 and 19 both at their inner peripheries and at their outer peripheries and such repulsion supports the weight of the rotating element as illustrated. Such a magnetic suspension takes up little space and does not need to add anything to the height of the meter as usually constructed. It utilizes the permanent magnet material to good advantage, and the shape of the magnets in relation to the direction of polarization therein conforms to good permanent magnet practice in that the length of the magnet path in each magnet is of appreciable length and equals the radius of such magnets. The leakage flux paths of such magnets are radial and confined to the immediate vicinity of the magnets, do not cross the axis of rotation, and do not interfere with the placing of such magnets in rather close proximity to other magnetic parts or coils. There is no tendency for leakage flux to pass diametrically through the shaft to cause locking. When the magnetic lifting force of the suspension is properly related to the weight supported, the vertical stability of the suspension is very satisfactory.

Fig. 2 shows a displacement-weight supporting curve for a magnetic suspension of the type shown in Fig. 1. The curve of Fig. 2 was obtained by using similar permanent magnets of an outside diameter of 1¼ inches and an inside diameter of $\frac{7}{16}$ inch, and a thickness of 0.025 inch, and made of an alloy of 50 per cent copper, 21 per cent nickel, and 29 per cent cobalt, according to United States Patent No. 2,170,047, August 22, 1939. The two disk magnets each had a weight of 4.25 grams and were capable of supporting a rotary weight of 30 grams. Referring now to the curve, Fig. 2, the point where the curve cuts the abscissa at the 4.25-gram point represents the spacing between the magnets with only the weight of the suspended magnet supported. This spacing is approximately 290 mils. As weight is added to the suspended or upper magnet, the separation between it and the stationary lower magnet decreases, and this is termed and plotted as increasing displacement. As the total weight supported increases and the displacement increases, the stability of the system becomes greater until the magnets touch each other at the maximum displacement of 290 mils and about 33 grams suspended weight.

The suspension is quite stable and is most efficiently used for a total supported weight of about 30 grams, with a spacing between the magnets of about 20 mils where the slope of the curve per gram of supported weight is 2.8 mils. The ratio of weight supported to total weight of magnet material used is $$\frac{30}{2 \times 4.25} = 3.52$$

The vertical spacing occupied by the magnetic suspension under the condition described when in normal operation and supporting a total of 30 grams is less than 0.1 inch, while the total diameter occupied by the suspension of 1¼ inches is generally less than the diameter of many conventional small measuring instruments. Hence, this form of suspension is suitable for many applications where other forms of magnetic suspensions would occupy or require more room than would be desirable.

In Fig. 3, I have shown a modified form of the radially magnetized disk repulsion magnetic suspension where 20 may represent the rotor or suspended magnet and 21 the stationary and lower magnet. Here the two magnets are made of different diameters and thicknesses, the smaller and lighter magnet being the one that is suspended. Only the inner south pole of the stationary magnet and the outer south pole of the suspended magnet are utilized for suspension purposes. This arrangement is, therefore, not economical of the permanent magnet material used but does have the advantage of a relatively lightweight, small diameter, suspended magnet.

In Fig. 4, I have represented my magnetic suspension as applied to an induction watthour meter type of device, where 22 represents a disk of conducting material constituting the rotor armature of the conventional induction watthour meter, 23 the meter frame, 25 and 26 upper and lower guide bearings of the general type shown at 14—15 in Fig. 1, and 24 the shaft of the meter. The guide bearings allow for limited axial displacement of the shaft. At 27 are indicated the positions of the meter drag magnets which are cast into the meter frame. The induction driving magnets will be mounted on the opposite side of the frame and are not seen. The weight of the rotor disk 22 and shaft 24 with any other parts carried thereby is supported by my magnetic suspension consisting of the rotor disk permanent magnet 18 secured to the underside of the armature 22, and the stationary and lower disk permanent magnet 19 supported on a collar 28 which is, in turn, supported from the stationary part of the lower guide bearing. The exact elevation of the magnet 19 is preferably adjustable by means adjusting the collar 28 up or down and fastening it by the setscrew indicated therein.

It will be evident that the magnets of the suspension are of sufficiently small diameter as not to interfere with any of the operating features of the meter, and that due to the confined flux leakage of this type of magnet suspension assembly, there will be no magnetic interference with the meter operation or accuracy. This form of magnetic suspension is particularly immune to demagnetizing and cross-magnetizing effects that might be caused by magnetic disturbances in the vicinity. If the two magnets of the suspension are concentric as contemplated, there will be no side thrust.

The suspension also lends itself to helping to protect the rotary system from shocks due to shipment and the like. Thus, it is noted in Fig. 1 that the rotor cannot be forced downward to injure the lower guide bearing because before the guide pin 14 strikes the inner end of the cavity in shaft 12, the magnet 18 will come to rest against magnet 19. A collar 29 secured on shaft 12 just below stationary magnet 19 serves with such magnet as a similar protective device for the upper guide bearing. Likewise, the shaft 12 cannot be forced sidewise to any appreciable extent without being stopped by the inner edge of magnet 19.

A well proportioned permanent magnet combination for this type of suspension using the alloy specified is as follows: both magnets similar, ¼ inch inside diameter, ⅝ inch outside diameter, and 0.05 inch thickness. For mechanical reasons in punching such washer-shaped parts from sheet material, each magnet could be made up of two washers each 0.025 inch thick.

The suspension may be placed at any convenient point along the shaft, at top, bottom, or at some intermediate point; and for convenience in assembly one or both of the washer-shaped magnets may be split across the diameter since this will not interfere with their radial polarization.

While the greatest economy in the use of permanent magnet material is probably obtained by making the thickness of magnets 18 and 19 of Fig. 1 equal, in special cases it may be desirable to make the suspended magnet thinner and hence lighter than the stationary magnet, and make the two magnets out of different suitable kinds of permanent magnet material.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A magnetic suspension for a vertical shaft comprising in combination with a supporting structure a rotary vertical shaft mounted on said structure, a substantially planar washer-shaped permanent magnet secured concentrically on said shaft, a second substantially planar washer-shaped permanent magnet, means for supporting said second permanent magnet on said structure in a fixed position concentrically with said shaft, below, parallel and closely adjacent the first-mentioned magnet, both of said permanent magnets being uniformly magnetized radially and having magnetic poles of like polarity in vertical alignment such that a magnet force of repulsion exists between such magnets tending to support the weight of said shaft and the magnet secured thereon.

2. A magnetic suspension for a vertical shaft comprising in combination with a supporting structure a rotary vertical shaft mounted on said structure, a substantially planar washer-shaped permanent magnet concentrically secured on said shaft, a second substantially planar washer-shaped permanent magnet of the same diameter as the first-mentioned magnet, means for securing said second magnet on said structure in fixed position concentric to said shaft, below, closely adjacent and parallel with the first-mentioned magnet, said magnets being uniformly radially polarized in the same direction such that both have magnetic poles at their inner and outer peripheries with the magnetic poles of like polarity in the different magnets in vertical alignment.

3. A magnetic suspension comprising a supporting structure, a vertical shaft, guide bearings between said supporting structure and shaft for maintaining said shaft vertical, permitting of its rotation and preventing its lateral displacement with respect to said supporting structure, and means for supporting the weight of said shaft comprising a substantially planar washer-shaped permanent magnet supported by said structure concentric to and surrounding said shaft, a second substantially planar washer-shaped permanent magnet secured to said shaft concentric thereto, said second permanent magnet being positioned above, closely adjacent to and parallel with the first-mentioned permanent magnet, both of said magnets being uniformly polarized radially so as to have circular magnet poles at their inner and outer peripheries, at least one of such magnetic poles being in vertical alignment with a magnetic pole of like polarity in the other magnet whereby a magnetic force of repulsion exists between such magnets sufficient to support the weight of the shaft and the magnet mounted thereon.

4. A magnetic suspension comprising supporting structure carrying a vertical shaft, a substantially planar washer-shaped permanent magnet mounted on and concentrically to said shaft, a second substantially planar washer-shaped permanent magnet, positioned below, closely adjacent and parallel to and concentric with said first-mentioned magnet, the second-mentioned permanent magnet being mounted on said structure and being of larger diameter and thicker than the first-mentioned magnet such that its inner peripheral portion lies beneath the outer peripheral portion of the first-mentioned magnet, said magnets being uniformly polarized in opposite radial directions such that the first-mentioned magnet has an outer peripheral magnetic pole in vertical alignment with an inner peripheral magnetic pole of like polarity of said second magnet.

5. Apparatus having supporting structure, a rotating element including a vertical shaft carried on said structure, guide bearings for preventing the lateral displacement of said shaft but permitting of limited axial displacement thereof, and magnetic repulsion means for supporting the weight of said rotating element comprising a substantially planar washer-shaped permanent magnet secured concentrically to said shaft, and a second substantially planar washer-shaped permanent magnet mounted on said structure, positioned closely beneath, parallel to and concentrically with respect to the first-mentioned magnet, said magnets being of the same inner and outer diameters and both being uniformly radially polarized in the same direction such that circular magnet poles are created at their inner and outer peripheries with like poles of each in vertical alignment, said permanent magnets being designed in relation to the weight of said rotating element to support the weight of the latter including the weight of the magnet secured to said shaft when the spacing between said magnets is of the order of 0.02 inch, and said guide bearings allowing for sufficient axial displacement of said rotating element as will permit of such weight supporting action.

LEWIS I. MENDELSOHN.

References Cited in the file of this patent

UNITED STATES PATENTS

| Number | Name | Date |
|---|---|---|
| 2,170,571 | Mott | Aug. 22, 1939 |
| 2,272,767 | Corson | Feb. 10, 1942 |
| 2,315,408 | Faus | Mar. 30, 1943 |
| 2,394,113 | Seaver | Feb. 5, 1946 |

FOREIGN PATENTS

| Number | Country | Date |
|---|---|---|
| 217,312 | Germany | Dec. 27, 1909 |